US010202926B2

(12) United States Patent
Nair et al.

(10) Patent No.: US 10,202,926 B2
(45) Date of Patent: Feb. 12, 2019

(54) METHODS AND SYSTEM FOR DIAGNOSING AN ENGINE COMPONENT BASED ON AN ENGINE SPEED PROFILE DURING AN ENGINE SHUTDOWN EVENT

(71) Applicant: General Electric Company, Schenectady, NY (US)

(72) Inventors: Shailesh Nair, Bangalore (IN); Pradheepram Ottikkutti, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 57 days.

(21) Appl. No.: 15/267,521

(22) Filed: Sep. 16, 2016

(65) Prior Publication Data

US 2018/0080404 A1 Mar. 22, 2018

(51) Int. Cl.
| F02D 41/22 | (2006.01) |
| F02D 41/04 | (2006.01) |
| F02D 41/00 | (2006.01) |
| G01P 21/02 | (2006.01) |
| F02B 77/08 | (2006.01) |
| G01P 3/481 | (2006.01) |

(52) U.S. Cl.
CPC ....... *F02D 41/222* (2013.01); *F02D 41/0097* (2013.01); *F02D 41/042* (2013.01); *F02D 41/22* (2013.01); *G01P 21/02* (2013.01); *F02B 77/08* (2013.01); *F02D 2200/101* (2013.01); *F02D 2200/1006* (2013.01); *F02D 2200/1012* (2013.01); *G01P 3/481* (2013.01)

(58) Field of Classification Search
CPC .. F01L 2800/11; F01L 2800/12; G01M 15/04; G01M 15/044; G01M 15/046; G01L 3/24; F02P 5/151
USPC ...... 123/406.18, 325, 332–335, 339.15, 436; 73/114.22
See application file for complete search history.

(56) References Cited

U.S. PATENT DOCUMENTS

| 3,657,922 | A | * | 4/1972 | Sibeud | ................ G01M 15/044 73/114.15 |
| 3,964,301 | A | * | 6/1976 | Hanson | ................... G01L 3/242 73/114.14 |
| 4,918,606 | A | * | 4/1990 | Ito | ........................... F16H 59/44 477/120 |
| 5,365,904 | A | * | 11/1994 | Nofsinger | ............. F02D 41/222 123/359 |
| 5,855,532 | A | * | 1/1999 | Sugiyama | ............... F16H 59/36 477/159 |
| 6,332,354 | B1 | * | 12/2001 | Lalor | ........................ B60T 8/00 701/70 |
| 7,000,598 | B2 | | 2/2006 | Sheikh et al. | |
| 7,350,405 | B2 | | 4/2008 | Sheikh et al. | |

(Continued)

*Primary Examiner* — Sizo Vilakazi
*Assistant Examiner* — Kevin R Steckbauer
(74) *Attorney, Agent, or Firm* — McCoy Russell LLP

(57) ABSTRACT

Various methods and systems are provided for diagnosing an engine component based on a measured engine speed during an engine shutdown event. As one embodiment, a method for an engine includes measuring an engine speed drop rate, via an engine speed sensor, during an engine shutdown event; and indicating a change in performance of one of the engine speed sensor or an additional engine component in response to the measured engine speed drop rate deviating from a reference engine speed drop rate by a pre-set or pre-defined threshold rate.

14 Claims, 5 Drawing Sheets

(56) References Cited

U.S. PATENT DOCUMENTS

| | | | | |
|---|---|---|---|---|
| 7,805,985 B2* | 10/2010 | Friedl | .................... | F02D 41/042 |
| | | | | 73/114.45 |
| 7,913,546 B2* | 3/2011 | Vinci | .................... | G01M 15/05 |
| | | | | 73/114.23 |
| 2008/0302176 A1* | 12/2008 | Friedl | .................... | F02D 41/042 |
| | | | | 73/114.45 |
| 2010/0116249 A1* | 5/2010 | Guerrassi | .............. | F02D 35/023 |
| | | | | 123/435 |
| 2010/0126259 A1* | 5/2010 | Vinci | .................... | G01M 15/05 |
| | | | | 73/114.23 |
| 2015/0361911 A1* | 12/2015 | Maeda | ................ | F02D 41/1497 |
| | | | | 123/197.4 |
| 2016/0025594 A1* | 1/2016 | Shimada | ................ | G01N 19/02 |
| | | | | 73/114.15 |
| 2016/0047322 A1* | 2/2016 | Henker | ................ | F02D 41/009 |
| | | | | 123/350 |
| 2016/0069759 A1* | 3/2016 | Shimada | .................... | G01L 3/24 |
| | | | | 73/114.15 |
| 2016/0202146 A1* | 7/2016 | Enomoto | .............. | F02D 41/009 |
| | | | | 73/114.26 |
| 2017/0234256 A1* | 8/2017 | Nodera | .................... | F02D 29/02 |
| | | | | 701/112 |

\* cited by examiner

METHODS AND SYSTEM FOR DIAGNOSING AN ENGINE COMPONENT BASED ON AN ENGINE SPEED PROFILE DURING AN ENGINE SHUTDOWN EVENT

TECHNICAL FIELD

Embodiments of the subject matter disclosed herein relate to an engine system including an engine speed sensor, such as a crankshaft speed sensor or another way of measuring or monitoring engine speed in real-time, and diagnosing engine components based on an engine speed profile during an engine shutdown event.

DISCUSSION OF ART

Engine systems may include an engine speed sensor, such as a crankshaft speed sensor or another engine speed sensor or sensors for determining a position and/or rotational speed of a crankshaft coupled to an engine. As such, an engine speed may be determined based on an output of the engine speed sensors (e.g., the crankshaft speed sensor or other engine speed sensor). During engine operation, a controller of the engine system may adjust engine operating parameters based on the determined engine speed. However, the crankshaft speed sensor or other engine speed sensor may become degraded or an accuracy of the output of the engine speed sensor may decrease. As a result, engine control based on outputs of the engine speed (e.g., crankshaft speed) sensor may be degraded, thereby resulting in degraded engine control and reduced engine efficiency. Additionally, over time, engine components may become worn or degraded, causing increased or decreased friction of the engine. In one example, engine friction models based on a test engine may be used to estimate engine component wear due to engine usage. Engine friction estimates may be used to adjust engine operation to account for predicted engine wear. However, these models may not account for anomalies in mechanical systems of the engine and thus not accurately predict engine wear.

BRIEF DESCRIPTION

In one embodiment, a method for an engine (e.g., a method for controlling an engine system) comprises measuring an engine speed drop rate, via an engine speed sensor, during an engine shutdown event; and indicating a change in performance of one of the engine speed sensor or an additional engine component in response to the measured engine speed drop rate deviating from a reference engine speed drop rate by a threshold rate.

DETAILED DESCRIPTION

Figure 1:
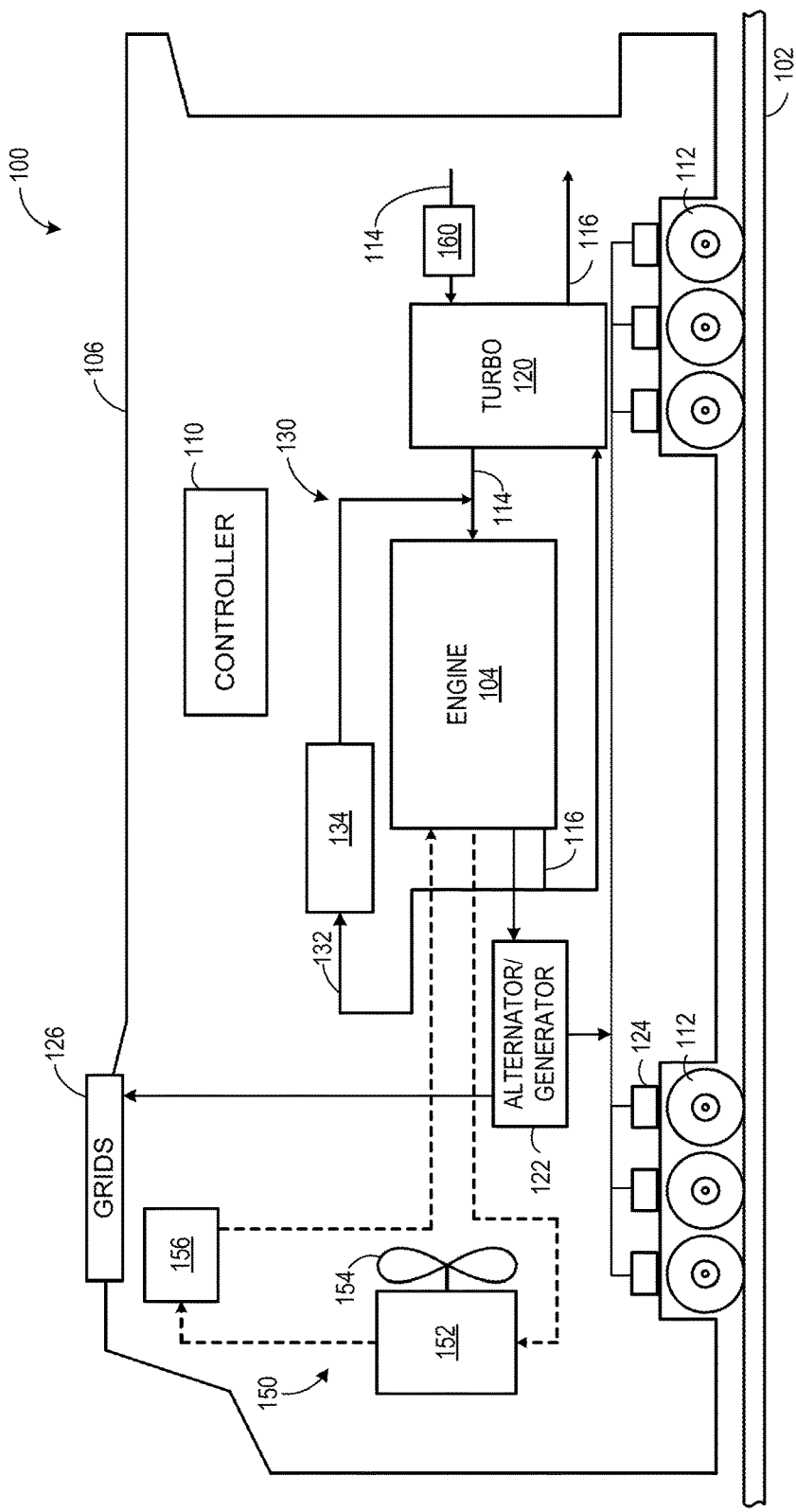
FIG. 1 shows a schematic diagram of a vehicle with an engine, according to an embodiment of the invention.

The following description relates to embodiments of diagnosing an engine component based on an engine speed during an engine shutdown event. As one embodiment, a method for an engine may include measuring an engine speed drop rate, via an engine speed sensor, during an engine shutdown event; and indicating a change in performance of one of the engine speed sensor or an additional engine component in response to the measured engine speed drop rate deviating from a reference engine speed drop rate by a threshold rate. The engine may include one or more engine speed sensors. In one example, the one or more engine speed sensors may include crankshaft speed sensors coupled to a crankshaft of the engine. In another example, the one or more engine speed sensors may be an alternate type of sensor adapted to measure engine speed. A controller of the engine may receive a signal from the one or more engine speed sensors and determine an engine speed.

During an engine shutdown event, cylinders may stop being fueled and a rotational speed of the crankshaft may slow down over a period of time until the engine comes to a stop. The engine speed drop rate, or rate at which the rotation of the crankshaft decreases, during the engine shutdown event, may be determined based on the output of the one or more engine speed sensors (e.g., crankshaft speed sensors). The measured, or estimated, engine speed drop rate may then be used to determine a change in performance of one or more components of the engine. In one example, the determined engine speed drop rate during the engine shutdown event may be compared to a reference engine speed drop rate. The reference engine speed drop rate may be based on a stored engine speed profile (e.g., stored engine speed drop rate for a standard engine shutdown event of the engine) and/or a learned and stored engine speed drop rate for the engine during its first (as new) operation and shutdown. The engine speed profile may be updated after each engine shutdown event in order to account for aging of the engine. However, if the measured engine speed drop rate deviates by a relatively large amount from the reference engine speed drop rate, the controller may indicate that the crankshaft speed sensor is degraded or outputting a faulty signal. In another example, each measured engine speed drop rate may be used to build a friction profile for the engine. Thus, over a period of time, or a number of engine shutdown events, the engine friction profile may be built and used to determine changes in a friction value of the engine. Over time, as the components of the engine age, friction of the engine may increase, thereby causing the measured engine speed drop rate to increase (e.g., the crankshaft may come to rest more quickly due to the increased friction). However, if a relatively large change in the friction profile occurs after measuring the engine speed drop rate during an engine shutdown event, this may be an indication that one or more engine components have become degraded and/or require increased lubrication. Such engine components may include a piston ring or piston rings or cylinder liner, valves of the engine cylinders, crankshaft bearings, or the like.

Figure 2:
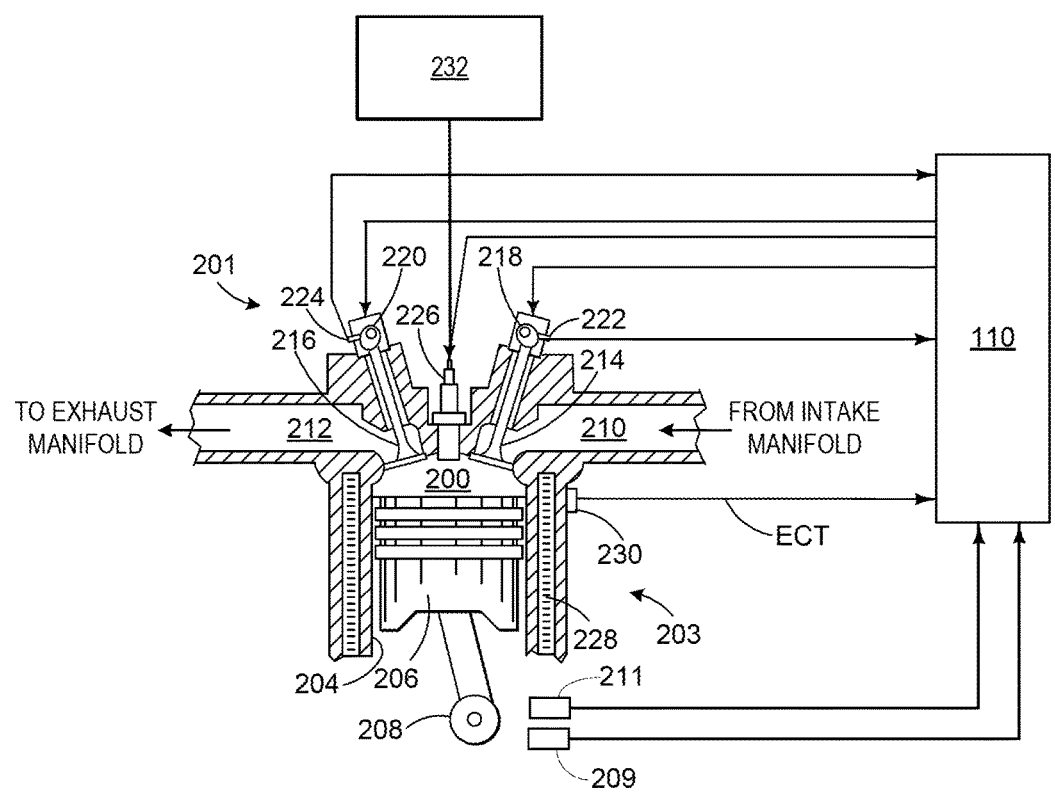
FIG. 2 shows a schematic diagram of a cylinder of the engine of FIG. 1, according to an embodiment of the invention.
Figure 3:
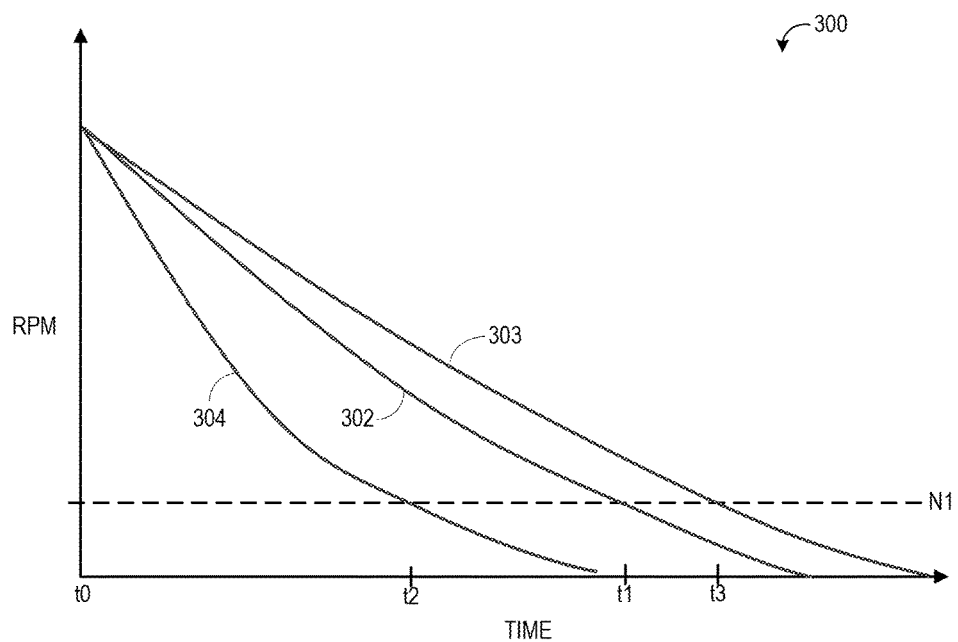
FIG. 3 shows a graph of changes to an engine speed profile during an engine shutdown event, according to an embodiment of the invention.
Figure 4:
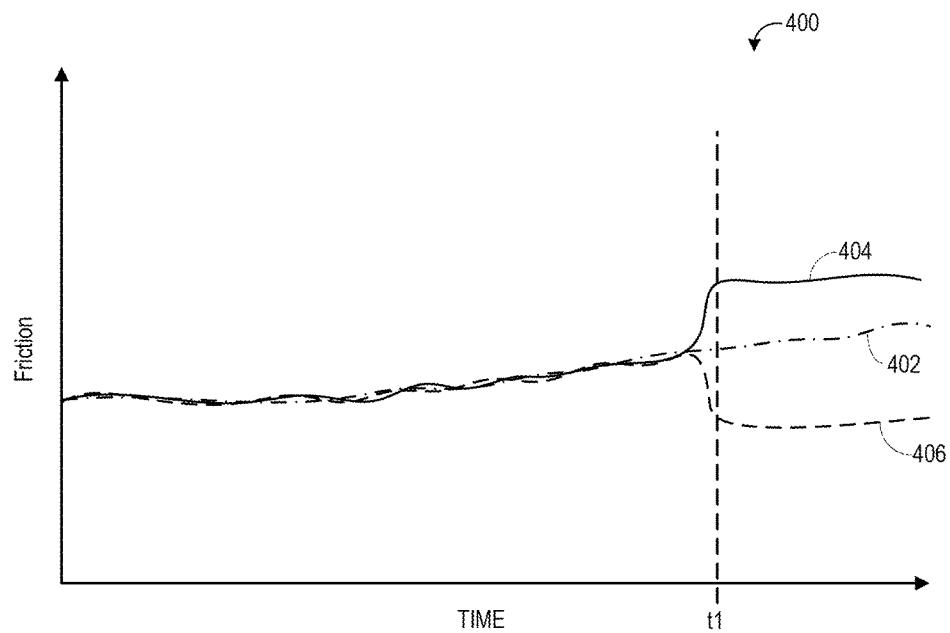
FIG. 4 shows a graph of changes to a friction profile of the engine, according to an embodiment of the invention.
Figure 5:
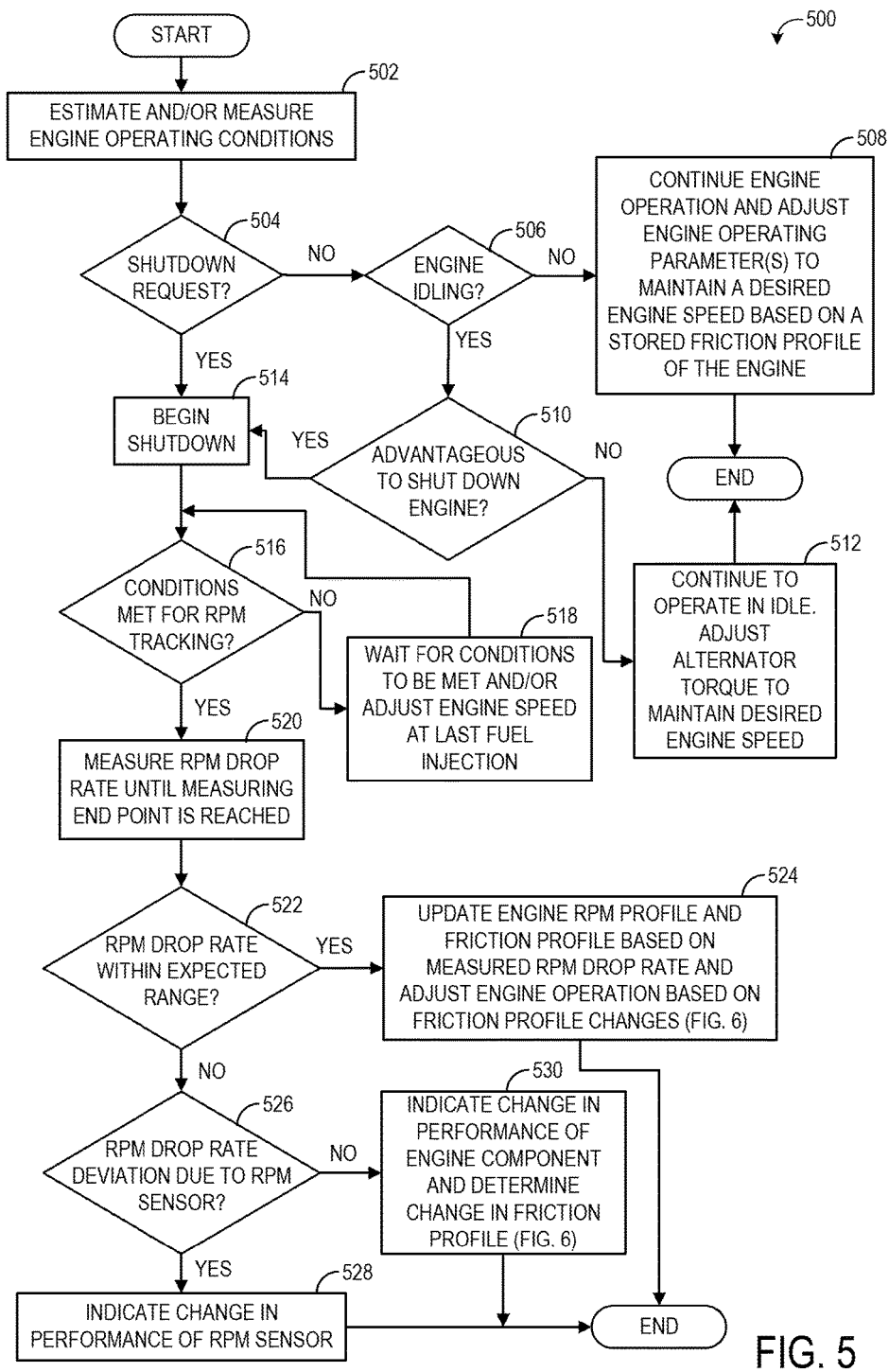
FIG. 5 shows a flow chart of a method for diagnosing an engine component based on an engine speed drop rate measured by a crankshaft speed sensor during an engine shutdown event, according to an embodiment of the invention.
Figure 6:
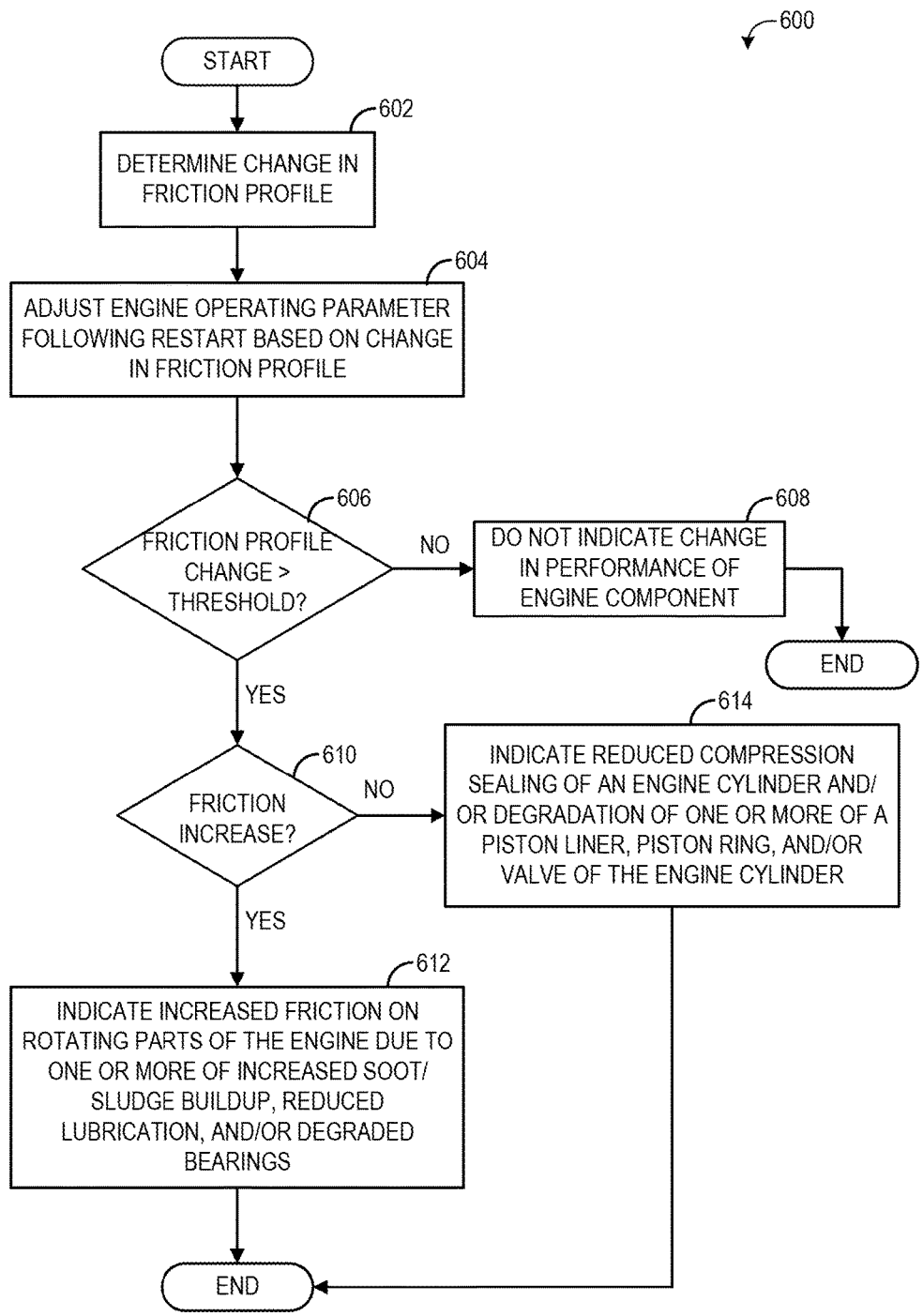
FIG. 6 shows a flow chart of a method for determining a friction profile of an engine and diagnosing an engine component based on changes to the friction profile, according to an embodiment of the invention.

FIG. 1 shows an embodiment of a vehicle including an engine. The engine may include one or more cylinders, such as the cylinder shown in FIG. 2. FIG. 2 additionally shows an engine speed sensor (e.g., crankshaft speed sensor) adapted to measure a speed of a crankshaft of the engine and output a signal (e.g., RPM signal) to a controller of the engine. FIG. 3 shows an example of changes in an engine speed profile, during an engine shutdown event and FIG. 4 shows an example friction profile of the engine. In one example, a friction profile of the engine may be updated based on the rate of decrease in the engine speed during each engine shutdown event. During operation, a request to shut down the engine may be received by the controller. During the engine shutdown event, the controller may track a decrease in engine speed based on the output of the crankshaft speed sensor. As shown in FIG. 5, the rate of decrease in engine speed may be used to diagnose a condition of the crankshaft speed sensor and/or an additional engine component. Increases or decreases in the tracked friction profile may indicate a change in performance of one or more engine components, as shown at FIG. 6.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for determining a change in performance of one or more engine components or sensors based on an engine speed drop rate during an engine shutdown event, an example of a platform is disclosed in which an engine may be configured for a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle includes an engine 104. In other non-limiting embodiments, the engine may be a stationary engine, such as in a power-plant application, or an engine in a marine vessel or other off-highway vehicle propulsion system or systems as noted above.

The engine receives intake air for combustion from an intake passage 114. The intake passage receives ambient air from an air filter 160 that filters air from outside of the rail vehicle. Exhaust gas resulting from combustion in the engine is supplied to an exhaust passage 116. Exhaust gas flows through the exhaust passage, and out of an exhaust stack of the rail vehicle. In one example, the engine is a diesel engine that combusts air and diesel fuel through compression ignition. In other non-limiting embodiments, the engine may additionally combust fuel including gasoline, kerosene, natural gas, biodiesel, or other petroleum distillates of similar density through compression ignition (and/or spark ignition, and/or other forms of ignition such as laser, plasma, or the like).

In one embodiment, the rail vehicle is a diesel-electric vehicle. As depicted in FIG. 1, the engine is coupled to an electric power generation system, which includes an alternator/generator 122 and electric traction motors 124. In one example, the alternator/generator 122 may include a direct current (DC) generator. For example, the engine is a diesel and/or natural gas engine that generates a torque output that is transmitted to the electric generator which is mechanically coupled to the engine. In one embodiment herein, the engine is a multi-fuel engine operating with diesel fuel and natural gas, but in other examples the engine may use other straight/mono fuels such as gasoline, diesel, or natural gas, or may use various combinations of fuels other than diesel and natural gas.

The generator produces electrical power that may be stored and applied for subsequent propagation to a variety of downstream electrical components. As an example, the generator may be electrically coupled to a plurality of traction motors and the generator may provide electrical power to the plurality of traction motors. As depicted, the plurality of traction motors are each connected to one of a plurality of wheels 112 to provide tractive power to propel the rail vehicle. One example configuration includes one traction motor per wheel set. As depicted herein, six pairs of traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by the alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system may further include an exhaust gas recirculation (EGR) system 130 coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system). As depicted in FIG. 1, the EGR system includes an EGR passage 132 and an EGR cooler 134 to reduce the temperature of the exhaust gas before it enters the intake passage. By introducing exhaust gas to the engine, the amount of available oxygen for combustion is decreased, thereby reducing the combustion flame temperatures and reducing the formation of nitrogen oxides (e.g., NOR).

In some embodiments, the EGR valve may further include an EGR valve or a system of more than one EGR valve for controlling an amount of exhaust gas that is recirculated from the exhaust passage of the engine to the intake passage of the engine. The EGR valve may be an on/off valve controlled by a controller 110 (e.g., the controller may include one or more processors), or it may control a variable amount of EGR, for example. As shown in the non-limiting example embodiment of FIG. 1, the EGR system is a high-pressure EGR system. In other embodiments, the vehicle system may additionally or alternatively include a low-pressure EGR system, routing EGR from downstream of the turbine to upstream of the compressor.

As depicted in FIG. 1, the vehicle system further includes a cooling system 150. The cooling system circulates coolant through the engine to absorb waste engine heat and distribute the heated coolant to a heat exchanger, such as a radiator 152. A fan 154 may be coupled to the radiator in order to maintain an airflow through the radiator when the vehicle is moving slowly or stopped while the engine is running. In some examples, fan speed may be controlled by the controller. Coolant which is cooled by the radiator enters a tank 156. The coolant may then be pumped by a water, or coolant, pump (not shown) back to the engine or to another component of the vehicle system, such as the EGR cooler.

The rail vehicle further includes the engine controller 110 (referred to hereafter as the controller) to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation.

The controller may receive information from a plurality of sensors and may send control signals to a plurality of actuators. The controller, while overseeing control and management of the rail vehicle, may be configured to receive signals from a variety of engine sensors, as further elaborated herein, in order to determine operating parameters and operating conditions, and correspondingly adjust various engine actuators to control operation of the rail vehicle. For example, the engine controller may receive signals from various engine sensors including, but not limited to, engine speed (such as from sensors 211 and 209 shown in FIG. 2, as described further below), engine load (derived from fueling quantity commanded by the engine controller, fueling quantity indicated by measured fuel system parameters, averaged mean-torque data, and/or electric power output from the alternator or generator), intake manifold air pressure, boost pressure, exhaust pressure, ambient pressure, ambient temperature, exhaust temperature, particulate filter temperature, particulate filter back pressure, engine coolant pressure, gas temperature in the EGR cooler, exhaust oxides-of-nitrogen quantity (from NOx sensor), exhaust soot quantity (from soot/particulate matter sensor), exhaust gas oxygen level sensor, or the like. Correspondingly, the controller may control the rail vehicle by sending commands to various components such as the traction motors, the alternator/generator, cylinder valves, fuel injectors, a notch throttle, or the like. Other actively operating and controlling actuators may be coupled to various locations in the rail vehicle.

FIG. 2 depicts an embodiment of a combustion chamber, or cylinder 200, of a multi-cylinder internal combustion engine, such as the engine 104 described above with reference to FIG. 1. Cylinder 200 may be defined by a cylinder head 201, housing the intake and exhaust valves and fuel injector, described below, and a cylinder block 203. In some examples, each cylinder of the multi-cylinder engine may include a separate cylinder head coupled to a common cylinder block.

The engine may be controlled at least partially by a control system including controller 110 which may be in further communication with a vehicle system, such as the vehicle system 100 described above with reference to FIG. 1. As described above, the controller 110 may further receive signals from various engine sensors including, but not limited to, engine speed from a first crankshaft speed sensor 209 and/or a second crankshaft speed sensor 211, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. In one example, the crankshaft speed sensor(s) may be a Hall effect sensor, variable reluctance sensor, linear variable differential transducer, an optical sensor, or other types/forms of speed sensors, configured to determine crankshaft speed (e.g., RPM) based on the speed of one or more teeth on a wheel of the crankshaft. Correspondingly, the controller 110 may control the vehicle system by sending commands to various components such as alternator, cylinder valves, throttle, fuel injectors, etc.

As shown in FIG. 2, the engine includes two crankshaft speed sensors (first crankshaft speed sensor 209 and second crankshaft speed sensor 211). In alternate embodiments, the engine may include only a single crankshaft speed sensor. In still other embodiments, one or both of the two crankshaft speed sensors may be an alternate type of engine speed sensor. As shown in FIG. 2, the controller receives individual signals (e.g., outputs) from each of the first crankshaft speed sensor and the second crankshaft speed sensor. In one example, each of these individual signals (which may be an analog output that includes a pulse each time a tooth of the wheel of the crankshaft passes the crankshaft speed sensor) may be converted by a processor of the controller into individual engine speed (e.g., RPM) signals. These individual (e.g., two in the case of two crankshaft speed sensors) engine speed signals may then be compared to one another to determine whether they are reading approximately the same value. In this way, the second crankshaft speed sensor may be a redundant sensor to the first crankshaft speed sensor and may allow for diagnosis of when an output of the first crankshaft speed sensor is degraded (e.g., different than expected). As such, comparing the two crankshaft speed sensor outputs may allow the controller to determine if one or both of the crankshaft speed sensors is degraded or experiencing an error in its output. In another example, each of the individual signals output by the two crankshaft speed sensors may be combined to form one engine speed signal that may then be used by the controller to adjust engine operation (e.g., adjust fueling to the cylinder).

The cylinder (i.e., combustion chamber) 200 may include combustion chamber walls 204 with a piston 206 positioned therein. The piston may include a piston ring and/or liner disposed between an outer wall of the piston and the inner wall of the cylinder. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake including an intake runner 210. The intake runner 210 receives intake air via an intake manifold. The intake runner 210 may communicate with other cylinders of the engine in addition to the cylinder 200, for example, or the intake runner 210 may communicate exclusively with the cylinder 200.

Exhaust gas resulting from combustion in the engine is supplied to an exhaust including an exhaust runner 212. Exhaust gas flows through the exhaust runner 212, to a turbocharger in some embodiments (not shown in FIG. 2) and to atmosphere, via an exhaust manifold. The exhaust runner 212 may further receive exhaust gases from other cylinders of the engine in addition to the cylinder 200, for example.

Each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 110 via an actuator 218. Similarly, the exhaust valve 216 may be controlled by the controller 110 via an actuator 220. During some conditions, the controller 110 may vary the signals provided to the actuators 218 and 220 to control the opening and closing of the respective intake and exhaust valves. The position of the intake valve 214 and the exhaust valve 216 may be determined by respective valve position sensors 222 and 224, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a high-pressure fuel system including a fuel tank 232, fuel pumps, and a fuel rail (not shown). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In other embodiments, ignition of the fuel-air mixture is achieved through the use of laser or plasma ignitors. Further, each cylinder of the engine may be configured to receive gaseous fuel (e.g., natural gas) alternative to or in addition to diesel fuel. The gaseous fuel may be provided to cylinder 200 via the intake manifold, as explained below, or other suitable delivery mechanism or mechanisms such as multi-port injection of gaseous fuel very close to the intake valve(s) of each cylinder or direct injection of gaseous fuel in to the engine cylinder.

As explained above, the engine may include one or more engine speed sensors (e.g., such as crankshaft speed sensors 209 and 211 show in FIG. 2). The engine speed sensor(s) may output a signal that an engine controller uses to determine an engine speed of the engine. The controller may then adjust one or more engine operating parameters (e.g., an amount of fuel being injected into engine cylinders via one or more fuel injectors) based on the determined engine speed in order to maintain the engine operating at a desired engine speed. However, the engine speed sensor(s) may experience errors that result in a sensor output that is different than an actual speed of the crankshaft (and thus engine). For example, the engine speed sensors(s) may become degraded such that their outputs become less accurate. This may result in reduced accuracy in estimating engine speed. Thus, fuel injection control based on the estimated engine speed may have reduced accuracy. In another example, the engine speed sensor(s) may experience a fault or sensor drift, thereby resulting in reduced accuracy of their outputs.

As one example, by tracking the engine speed determined from the output of the crankshaft speed sensor (or alternate engine speed sensor), a controller may diagnose a change in performance of the crankshaft speed sensor. For example, an engine speed profile of the engine, during an engine shutdown event (where cylinders of the engine stop being fueled and the rotational speed of the crankshaft slows down to a lower threshold, which may be where the crankshaft stops rotating and comes to rest) may be stored in a memory of the controller of the engine. For example, a baseline or expected engine speed profile for a relatively new engine may be initially stored in the controller's memory. An example engine speed profile for an engine is shown in FIG. 3. By tracking the engine speed profile during an engine shutdown event, excessive or above-normal degradation/deterioration of engine components may be determined since the shutdown event corresponds to insignificant-to-zero (e.g., fueling below a threshold) fueling which corresponds to fast/rapidly decreasing engine speed (RPM). Thus, just after engine shutdown, the effect or influence of fueling on engine speed may be absent and/or irrelevant.

FIG. 3 shows a graph 300 of a first engine speed profile 302 which may be an initially stored engine speed profile of a relatively new engine. The engine speed profile is a curve representing the decrease in engine speed during an engine shutdown event. In one example, the first engine speed profile 302 may be determined from engine benchmark testing prior to engine operation and/or from test data of a test engine. In another example, the first engine speed profile 302 may be learned, by the controller, during a first engine shutdown event (or a first series of engine shutdown events) of the engine. For example, during an engine shutdown event, the controller may track the output of the crankshaft speed sensor (shown as RPM along the y-axis of graph 300) over time (shown on the x-axis). Thus, graph 300 shows the decrease in engine speed during the engine shutdown event, from a start of tracking at time t0, to end of tracking at time t1. The start of tracking may include a time at which fueling to the engine cylinders is below a threshold fueling amount or rate and oil temperature is greater than a threshold oil temperature. In one example, the threshold fueling amount or rate may be an amount or rate of fuel indicative of the fuel injectors not injecting fuel into the cylinders. In another example, the threshold oil temperature may be an oil temperature at which the engine is still hot at a time corresponding to the engine shutdown command from the engine controller plus a pre-set number of milliseconds. Further, the start of tracking may begin after a final fuel injection into a last engine cylinder. The end of tracking may include an engine speed greater than a lower threshold engine speed N1. For example, the lower threshold engine speed may be an engine speed below which considerable noise in the RPM signal is seen and thus determining a drop rate in engine speed may be less accurate.

During engine operation, the controller may track the decrease in engine speed during each engine shutdown event (or every X number of engine shutdown events) and update the stored engine speed profile based on the newly measured engine shutdown speed data. For example, engine speed during an engine shutdown may be a function of engine friction and inertia of moving parts of the engine alone, since the engine is no longer being fueled, combustion has been ceased/discontinued, and thus pistons are no longer driving the crankshaft. As such, the engine speed profile (e.g., signature or engine speed decay) during the engine shutdown follows a defined pattern which may be fit with a regression model, such as a cubic polynomial regression model. The engine speed profile may be defined by a transfer function specific to each engine. For example, the controller may determine a regression model of the stored engine speed profile. As one example, the engine speed profile may follow a cubic polynomial regression model (e.g., function) and have the form: $Ax^3+Bx^2+Cx+D$, where A and C may have negative values. The coefficients, A, B, C, and D, may be determined by the controller and stored in the memory of the controller. Following each engine shutdown and/or engine speed tracking event, the controller may then update the stored engine speed profile and coefficients of the regression model. The stored function may be used to determine an expected reference speed signal that may be compared to an actual engine speed signal output by the crankshaft speed sensor during an engine shutdown event. The crankshaft speed sensor may then be diagnosed based on the reference speed signal (or stored engine speed profile), as explained further below with regard to FIGS. 5-6.

Over time, the engine speed profile of the engine may change due to wear of engine components and/or reduced lubrication of engine components. FIG. 3 shows an example of a second engine speed profile 304 and third engine speed profile 303 of the engine that may occur after a duration of engine use. The second engine speed profile 304 may have a faster rate of decrease in engine speed due to increased friction of engine components (e.g., due to aging) and ends at time t2 (which occurs before time t1) for the lower threshold engine speed N1. The third engine speed profile 303 may have a slower rate of decrease in engine speed due to decreased friction engine speed profile may end at time t3 (which occurs after time t1) for the lower threshold engine speed N1. The engine having the third engine speed profile 303 takes a longer time duration to shut down than if the engine had the first or second engine speed profiles. Typically, over a normal course of engine operation/running, the friction profile will decrease as the engine ages (as shown by the third engine speed profile 303). This may be due to mechanical parts setting-in and the matching/mating surfaces becoming more compatible with optimum surface finish characteristics. An increase in friction (as shown by the second engine speed profile 304) is often caused by an abnormal event or a combination of abnormal events such as: debris ingression into running parts, poor oil quality, unsuitable/poor/bad operating environment, or the like. An engine friction profile of the engine may be built based on the tracked changes to the engine speed profile. For example, as the friction of the engine increases, the rate of decrease in engine speed for each engine shutdown event may increase. Similarly, as the friction of the engine decreases, the rate of decrease in engine speed for each engine shutdown event may decrease.

FIG. 4 shows a graph 400 of an example friction profile of an engine that is built by the controller based on changes to the engine speed profile of time (e.g., over a number of engine shutdown events). Graph 400 shows friction on the y-axis (which, in one example, may have units of force such as Newtons, N) and time on the x-axis. Specifically, graph 400 shows a first friction profile 402 of an engine. Over time, or over the useful life of the engine, this friction profile will slowly increase or decrease over time due to engine wear and/or reduced lubrication of engine components. Without taking additional preventative measures (such as replacing components), the amount of change in friction of the first friction profile 402 may be an expected amount of change, which may be programmed into the engine controller as an acceptable "tolerance band", to account for aging of the engine and thus may not result in the controller indicating a change in performance (such as degradation) of one or more engine components. Graph 400 also shows a second friction profile 404 and a third friction profile 406 where there is a change in the friction profile over a threshold amount of change at time t1. As described further below, by monitoring changes in the engine speed and friction profile, the engine controller may recognize larger variations in engine degradation (which may be greater than the "tolerance band"), which may be the threshold amount of change. In one example, the threshold amount of change may be an amount of change in the friction profile that indicates a change in performance of one or more engine components caused the relatively large change in friction (over the expected increase due to standard engine aging). The second friction profile 404 shows a relatively large increase in friction from the previous trend. The third friction profile 406 shows a relatively large decrease in friction from the previous trend. In response to these relatively large changes in the friction profile, the controller may indicate a change in performance of one or more engine components and diagnose which engine component caused the change, as described further below with regard to FIGS. 5-6.

Turning to FIG. 5, a flow chart of a method 500 for determining a change in performance of an engine component based on an output of a crankshaft speed sensor during an engine shutdown event is shown. As explained further below, the engine component may include one or more crankshaft speed sensors, a component of a piston and cylinder (such as a piston liner and/or piston ring), a valve of a cylinder (such as an intake and/or exhaust valve), bearings of a crankshaft, or the like. Method 500 and the rest of the methods described herein may be executed by an engine controller (such as controller 110 shown in FIGS. 1-2) according to instructions stored in the memory of the controller, in combination with various sensors and actuators of the engine system. As one example, the controller may receive an electrical signal (such as an analog signal indicating a tooth of a wheel of the crankshaft passing the crankshaft speed sensor) from one or more crankshaft speed sensors (such as crankshaft speed sensors 209 and 211 shown in FIG. 2). The controller may then process these signals to determine an engine speed (e.g., RPM of the crankshaft) and engine speed profile of the engine during the engine shutdown event. The controller may also actuate one or more actuators of various engine components based on the determined engine speed. For example, the controller may send an electrical signal to an actuator of a fuel injector to adjust an amount of fuel injected into an engine cylinder according to instructions stored in a memory of the controller regarding a desired fuel injection amount for a determined engine speed. Thus, the desired engine speed can be achieved during engine operation.

Starting at 502, the method includes estimating and/or measuring engine operating conditions. Engine operating conditions may include engine speed, engine load, engine temperature, mass air flow, intake air temperature, exhaust temperature, or the like. At 504, the method includes determining if there is an engine shutdown request. For example, the method may include determining whether the controller has received a signal from a vehicle operator (e.g., via a key off signal) indicating a request to stop fueling cylinders of the engine and shut down the engine. In another example, a shutdown request may be generated at the controller in response to a request to perform engine speed (e.g., RPM) tracking to update a stored engine speed profile and/or friction profile of the engine. For example, after a number of engine cycles and/or a set duration of engine operation since a last update to the stored engine speed and/or friction profiles, the controller may generate a flag indicating a request to shut down the engine when select engine operating conditions are met. The select engine operating conditions may include when the engine is idling (e.g., when the vehicle in which the engine is installed is stationary and torque is not demanded by the vehicle operator).

If there is not a shutdown request, the method continues to 506 to determine whether the engine is idling. In one example, the engine may be idling when a speed of the vehicle is less than a threshold speed and/or a torque demand of the engine is less than a torque threshold. For example, the engine may be idling when the vehicle is not in motion. If the engine is not idling, the method continues to 508 to continue the current engine operation and adjust one or more engine operating parameters to maintain a desired engine speed based on a stored friction profile of the engine. As explained above, a friction profile for the engine (such as the friction profiles shown in FIG. 4) may be built based on changes to an engine speed drop rate during an engine shutdown event, over a number of engine shutdown events. The friction profile may be stored in a memory of the controller and used to determine a current friction value for the engine. The controller may then adjust engine operating parameters based on the current friction value. For example, the controller may determine a fuel value (e.g., an amount of fuel or rate of fuel to be injected into one or more cylinders via one or more fuel injectors) based on the current friction value and a desired engine speed. Specifically, the controller may use the friction value for engine speed feedback control to maintain a relatively constant and desired engine speed. As one example, the controller may look up the current friction value from the stored friction profile and then make a logical determination of the fuel value to achieve a desired engine speed at the current friction value based on logic rules that are a function of the desired engine speed and current friction value. The controller may then generate a control signal that is sent to an actuator of a fuel injector to inject the determined fuel value. As one example, the control signal may be a pulse width of fuel to inject into the engine cylinder.

Alternatively, at 506, if the engine is idling, the method continues to 510 to determine whether it is advantageous to shut down the engine. For example, when the engine is idling, it may continue to consume fuel. Thus, operating the engine in idle may result in reduced fuel economy and increased stress on engine components, as well as increased emissions. Alternatively, the engine may be shut down and therefore stop injecting fuel and combusting the injected fuel. This may reduce fuel consumption and emissions of the engine. In one example, it may be advantageous to shut down the engine if the fuel savings from not combusting fuel at the engine cylinders outweighs the energy usage from continuing to operate one or more electrical loads of the engine while the engine is off. In another example, it may be advantageous to shut down the engine if there is a request from the controller to update the stored engine speed and/or friction profiles. For example, a request to update the stored engine speed and/or friction profiles may be generated by the controller in response to a duration or number of engine cycles since the last engine shutdown event and engine speed tracking event. If the controller determines that it is not advantageous to shut down the engine, the method continues to 512 to continue to operate the engine in idle. The method at 512 may also include adjusting alternator torque to maintain a desired engine speed (e.g., instead of adjusting fuel injection to maintain the desired engine speed).

Alternatively, if the controller determines that it is advantageous to shut down the engine, the method continues to 514 to initiate the engine shutdown. Initiating the engine shutdown may include sending a final fuel injection signal to a fuel injector of a last cylinder and not sending fuel injection signals to any other cylinders. At 516, the method includes determining whether conditions are met for engine speed (e.g., RPM) tracking. Conditions for tracking the drop in engine speed during the engine shutdown event may include one or more or each of: a fueling amount or rate of fueling at each engine cylinder below a threshold engine fueling value, an oil temperature above a threshold oil temperature, and/or an engine speed at a first threshold engine speed. In one example, the first threshold engine speed may be an engine speed at which engine speed tracking begins (e.g., time t0 as shown in FIG. 3). For example, during an engine shutdown, engine speed tracking may begin at a set engine speed (e.g., the first threshold engine speed) so that the engine speed profile is normalized and comparable between different engine shutdown events. In an alternate embodiment, tracking the engine speed drop rate may begin at any engine speed (or within a range of engine speeds) and then be normalized, after tracking, for comparison to the stored engine speed profile. If conditions for engine speed tracking are not met, the method continues to 518 to wait for the conditions to be met and/or to adjust engine speed to the first threshold engine speed at the last fuel injection (e.g., the last fuel injection event at a last cylinder before no longer injecting fuel into any of the engine cylinders). For example, the controller may send a signal to the final fuel injector to inject an amount of fuel that will result in an engine speed at or within a range of the first threshold engine speed.

When the conditions for engine speed tracking are met, the method continues to 520 to measure and/or estimate the engine speed drop rate (e.g., rate of decrease in engine speed) via outputs of one or more crankshaft speed sensors until a measuring end point. The measuring end point may include a lower threshold engine speed, as explained above with regard to FIG. 3 (e.g., lower threshold engine speed N1). Measuring or estimating the engine speed drop rate at 520 may include determining a rate of decrease in the engine speed from the start of tracking to the end of tracking (e.g., measuring end point). For example, the controller may determine a slope of the engine speed profile between the start and ending time points. In another example, the controller may fit a regression (such as the cubic polynomial regression explained above with regard to FIG. 3) to the tracked engine speed profile and determine the regression coefficients. As one example, one or more of the regression coefficients may be indicative of the engine speed drop rate.

In some examples, if the start of tracking does not include a set engine speed (e.g., each tracking event may begin at different engine speeds), the method at 520 may additionally include adjusting the measured engine speed drop rate based on a final engine speed during the final fuel injection, before starting the tracking of the engine speed. In this way, the measured engine speed drop rate and/or profile may be normalized to a set engine speed range for accurate comparison to the stored engine speed profile and drop rate. The method at 520 may further include adjusting the measured engine speed drop rate, before comparing to the expected or reference engine speed drop rate, based on skip fire parameters of the engine prior to the engine shutdown event, alternator torque during the engine shutdown event, and/or or an altitude of the engine during the engine shutdown event. For example, the controller may adjust the measured engine speed drop rate (and engine speed profile) as a function of a number of cylinders that were skipped prior to shutting down the engine, an amount of torque applied to or absorbed from the engine by the alternator prior to and/or during the engine shutdown event, and/or a current altitude at which the engine is operating at the start of the engine shutdown event.

The method then continues to 522 to determine whether the engine speed drop rate (or the adjusted engine speed drop rate) determined at 520 is within an expected range. The expected range may be based on a currently stored engine speed profile. For example, as explained above, the controller may look-up the stored engine speed profile and/or regression coefficients of the engine speed profile and use this stored data to determine a reference engine speed drop rate. The reference engine speed drop rate may be a slope of the stored engine speed profile and/or a function of the stored engine speed profile regression coefficients. If the measured engine speed drop rate (e.g., rate determined from the engine speed measured by the crankshaft speed sensor) is within a threshold range of the reference (e.g., expected) engine speed drop rate, the method continues to 524 to update the stored engine speed profile (and regression coefficients of the engine speed profile) and the stored friction profile based on the newly measured engine speed drop rate. As one example, this may include updating a graph of values of engine speed vs. time between the start and ending time points stored within the memory of the controller and/or updating the stored regression values within a look-up table in the memory of the controller. The method at 524 may further include adjusting engine operation based on friction profile changes, as explained further below with reference to FIG. 6.

Returning to 522, if the measured engine speed drop rate is not within the expected range (e.g., the measured engine speed drop rate deviates from the reference or expected engine speed drop rate by a threshold rate), the method continues to 526 to determine if the deviation in the engine speed drop rate from the expected range or value is due to a change in performance of the crankshaft speed sensor (which may be a first crankshaft speed sensor in an engine including more than one crankshaft speed sensor). As one example, the method at 526 may include determining whether a redundant, second crankshaft speed sensor read approximately the same values or followed approximately the same engine speed profile during the engine shutdown event as the primary, first crankshaft speed sensor. If the output of the first crankshaft speed sensor differs from the second crankshaft speed sensor by more than a threshold amount, this may be indicative of an error in or degradation of the first crankshaft speed sensor. For example, if a first engine speed drop rate measured by the first crankshaft speed sensor deviates from the reference engine speed drop rate (e.g., is outside the expected range) but an engine speed drop rate measured by the second crankshaft speed sensor during the same engine shutdown event did not deviate from the reference engine speed drop rate by at least the threshold rate, then the controller may determine the first crankshaft speed sensor is degraded or experiencing a sensing error.

As another example, if no additional diagnostic error code indicating a change in performance (e.g., degradation) of an alternate engine component (e.g., such as a piston, cylinder, or cylinder valve) is set in the controller, this may be indicative that the deviation in the measured engine speed drop rate (measured via the crankshaft speed sensor during the engine shutdown event) is due to a change in performance of the crankshaft speed sensor. If the controller determines that the deviation in the engine speed drop rate from the expected range or value is due to a change in performance of the crankshaft speed sensor, the method continues to 528 to indicate a change in performance of the crankshaft speed sensor. As one example, indicating the change in performance of the crankshaft speed sensor may include indicating, via a visual or audible signal, to a user that the crankshaft speed sensor should be serviced/replaced. In another example, indicating the change in performance of the crankshaft speed sensor may include setting a diagnostic code within the controller and/or running a diagnostic routine for further diagnosing the crankshaft speed sensor. Further, the change in performance of the crankshaft speed sensor may be caused by mechanical degradation of the crankshaft speed sensor and/or a sensor fault. The method at 528 may further include adjusting engine operation based on the output of the second crankshaft speed sensor (if the engine includes two crankshaft speed sensors and the first crankshaft speed sensor is indicated as being faulty or degraded) and not based on the output of the first crankshaft speed sensor. In this way, a desired engine speed of the engine may be achieved, even when engine speed feedback via the first crankshaft speed sensor is not available (e.g., due to it having reduced accuracy).

Alternatively, if the controller determines that the deviation in the engine speed drop rate from the expected range or value is not due to a change in performance of the crankshaft speed sensor, the method continues to 530 to indicate a change in performance of an alternate engine component (other than the crankshaft speed sensor(s)) and determine the change in the friction profile of the engine, as explained further below with reference to FIG. 6.

Turning to FIG. 6, a method 600 for determining changes in the friction profile of the engine and diagnosing an engine component based on the determined changes to the friction profile is shown. Method 600 may continue from method 500, as described above. At 602, the method includes determining a change in the stored friction profile. As explained above, the controller may determine a friction value as a function of the engine speed drop rate determined during an engine shutdown event. The controller may then store the friction value in a look-up table or as graph (friction as a function of time, as shown in the example friction profiles of FIG. 4) stored in the memory of the controller. Determining changes in the stored friction profile may include comparing a most recently determined friction value to a previous friction value (e.g., friction value at the latest time point stored in the graph or table) and determining an amount that the most recently determined friction value differs from the previous friction value. At 604, the method includes adjusting an engine operating parameter following an engine restart based on the change in the friction profile, as described above with reference to the method at 508 in FIG. 5. As explained above, the controller may determine, based on logic rules stored in the controller, a fuel value (e.g., fuel injection amount or rate) as a function of the change in the friction profile and then send a signal to an actuator of a fuel injector to inject the determined fuel value.

At 606, the method includes determining whether the determined change in the friction profile is greater than a threshold friction amount (or value). The threshold friction value may be a friction value that indicates a change in performance (e.g., such as degradation) of an engine component. Changes in the friction profile below the threshold friction value may be indicative of regular aging of engine components and not degradation of one of the engine components. As such, if the friction profile does not change by or more than the threshold friction value, the method continues to 608 to not indicate a change in performance in an engine component and to continue engine operation.

Alternatively, at 606, if the determined change in the friction profile is greater than the threshold friction value, the method continues to 610 to determine if the change in the friction profile is an increase in friction (vs. a decrease in friction). If the friction profile change is an increase in friction above the threshold friction value, the method continues to 612 to indicate increased friction on one or more rotating parts of the engine. As one example, indicating increased friction at 612 may include setting a diagnostic code and/or sending a visual or audible signal to the vehicle operator, notifying the vehicle operator that one or more engine components may need to be serviced or replaced. As a result of the diagnostic code, the controller may execute an additional diagnostic routine to determine which engine component(s) are causing the increase in friction. The increased friction may be due to one or more of increased soot or sludge buildup on engine components (such as on the crankshaft, in the cylinders, or on surface of the pistons), reduced lubrication of one or more engine components (such as reduced lubrication on the crankshaft components or bearings, the piston, or the like), and/or degraded crankshaft bearings.

Alternatively, at 610, if the change in the friction profile is not an increase in friction, then it is a decrease in friction and the method continues to 614. At 614, the method includes indicating reduced compression sealing of an engine cylinder and/or degradation of one or more of a piston liner, piston ring, and a valve of the engine cylinder. For example, if the friction value of the engine decreases, this may be due to reduced compression sealing caused by a worn (or degraded) piston liner or piston ring. As one example, indicating decreased friction at 614 may include setting a diagnostic code and/or sending a visual or audible signal to the vehicle operator, notifying the vehicle operator that one or more engine components may need to be serviced or replaced. As a result of the diagnostic code, the controller may execute an additional diagnostic routine to determine which engine component(s) are causing the decrease in friction. Alternatively, the controller may determine which engine component is causing the change in friction (either reduced or increased) based on the determined change in friction and another diagnostic code set in the controller. For example, the controller may simultaneously run multiple diagnostic routines to diagnose the health of different engine components. If a diagnostic code is set indicating degradation of an intake or exhaust valve of the cylinder, in addition to the indication that the engine's friction profile has reduced, the controller may determine that the cylinder intake or exhaust valve is degraded. Thus, the friction profile diagnostic described above may be used to determine which engine component is degraded when another routine indicates the level/extent of engine component degradation as well.

In this way, monitoring a decrease in engine speed, measured and determined from an output of a crankshaft speed senor, during an engine shutdown event, may provide an indication of the performance of one or more engine components. A stored engine speed profile and friction profile of the engine may be updated following each engine speed tracking event during each engine shutdown event. Based on changes to the engine speed profile, the controller may update the friction profile. If relatively large changes in the engine speed drop rate and/or the friction profile are observed, the controller may indicate a change in performance (e.g., degradation or error) of one or more engine components, which may include the crankshaft speed sensor. Having a redundant, second engine speed sensor may allow for the controller to determine whether a deviation in the engine speed drop rate is due to a fault in or degradation of the first engine speed sensor, or an alternate engine component of the engine. By tracking changes in the engine speed and friction profile of the engine, the crankshaft speed sensor and aging of additional engine components may be diagnosed. As a result, engine controls used to maintain a desired, relatively constant engine speed (e.g., a fuel injection amount) may be adjusted to account for changes in friction of the engine. This may result in more efficient engine control. Thus, the technical effect of indicating a change in performance of one of the crankshaft speed sensor or an additional engine component in response to an engine speed drop rate, measured by the crankshaft speed sensor during an engine shutdown event, deviating from a reference engine speed drop rate by a threshold rate is determining degradation of one or more components of the engine and adjusting engine control to increase engine efficiency, even as engine components age or become degraded. Further, this method may provide an early way of indicating degradation of engine components, thereby allowing a user to service and/or replace degraded engine components before causing further degradation to additional engine components or reduced accuracy of engine control.

As one embodiment, a method for an engine comprises measuring an engine speed drop rate, via an engine speed sensor, during an engine shutdown event; and indicating a change in performance of one of the engine speed sensor or an additional engine component in response to the measured engine speed drop rate deviating from a reference engine speed drop rate by a threshold rate. In one example, the reference engine speed drop rate is determined based on an expected engine speed profile during the engine shutdown event stored in a memory of a controller of the engine and further comprising, updating the stored engine speed profile based on the measured engine speed drop rate. The method may further comprise building a friction profile of the engine over time based on changes to the stored engine speed profile and monitoring changes in the friction profile. In one example, the method may further comprise adjusting an engine operating parameter during engine operation following the engine shutdown event, based on the changes in the friction profile, to maintain a desired engine speed. In another example, the method may further comprise indicating the change in performance of the additional engine component in response to the friction profile changing by greater than a threshold friction amount. For example, indicating the change in performance of the additional engine component may include indicating one or more of wear to an engine valve, degradation of a piston liner, or degradation of a piston ring in response to the friction profile decreasing by at least the threshold amount; and indicating one or more of increased soot buildup on a rotating component of the engine, reduced lubrication to the rotating component, or degraded crankshaft bearings, in response to the friction profile increasing by at least the threshold amount. In one example of the method, the engine speed sensor is a first crankshaft speed sensor and the method may further comprise indicating the change in performance of the first crankshaft speed sensor in response to the measured engine speed drop rate deviating from the reference engine speed drop rate by the threshold rate and an engine speed drop rate measured by a second crankshaft speed sensor during the engine shutdown event not deviating from the reference engine speed drop rate by the threshold rate. In another example, the method may further comprise indicating the change in performance of the engine speed sensor in response to the measured engine speed drop rate deviating from the reference engine speed drop rate by the threshold rate and no additional diagnostic code being set in a controller of the engine indicating the change in performance of the additional engine component. In one example of the method, measuring the engine speed drop rate via the engine speed sensor during the engine shutdown event occurs between a first time after engine shutdown when fueling to the engine is below a threshold fueling rate and an oil temperature of the engine is above a threshold oil temperature and a second time after engine shutdown when the engine speed decreases to a lower threshold engine speed. For example, the first time may include after a final fuel injection into a last cylinder of the engine and the method may further comprise, adjusting a fuel injection amount of the final fuel injection to adjust engine speed to a starting engine speed for measuring the engine speed drop rate during the engine shutdown event. In another example, the first time includes after a final fuel injection into a last cylinder of the engine and the method further comprises adjusting the measured engine speed drop rate based on a final engine speed during the final fuel injection. In yet another example, the method may further comprise initiating the engine shutdown event in response to the engine idling and a request to update an engine speed profile or friction profile of the engine during select engine operating conditions, where the engine speed profile and friction profile are updated based on the measured engine speed drop rate during the engine shutdown event.

As another embodiment, a method for an engine comprises tracking changes in a measured drop rate in engine speed output by a crankshaft sensor during an engine shutdown event over a plurality of engine shutdown events; determining a friction profile of the engine based on the tracked changes in the measured drop rate in engine speed; and adjusting engine operation based on changes to the friction profile. In one example, adjusting engine operation based on the changes to the friction profile includes adjusting a fuel value of the engine during subsequent engine operation to maintain a desired engine speed, based on the changes to the friction profile. The method may further comprise indicating a change in performance of an engine component in response to a change in the friction profile greater than a threshold friction amount, where indicating the change in performance of the engine component includes: indicating reduced compression sealing of an engine cylinder and degradation of one or more of a piston liner, piston ring, or a valve of the engine cylinder in response to the friction profile decreasing by at least the threshold friction amount; and indicating increased friction on rotating parts of the engine due to one or more of increased deposit buildup, reduced lubrication, or degraded bearings, or such other wear-contributing mechanisms/modes in response to the friction profile increasing by at least the threshold friction amount. In another example, the method may further comprise adjusting each measured drop rate in engine speed based on one or more of a starting engine speed after fueling a final cylinder of the engine during the engine shutdown event, skip fire parameters of the engine prior to the engine shutdown event, alternator torque during the engine shutdown event, or an altitude of the engine during the engine shutdown event.

As yet another embodiment, a system for an engine includes a first crankshaft speed sensor and a controller (e.g., having one or more processors) operatively coupled to the first crankshaft speed sensor (e.g., wirelessly, and/or by way of one or more wires or other electrical connections). The controller is configured (e.g., with computer readable instructions stored in memory) to: determine a first rate of decrease in engine speed output by the first crankshaft speed sensor during an engine shutdown event; and indicate (e.g., generate a control signal or other control signal relating to) a change in performance of the first crankshaft speed sensor in response to the determined first rate of decrease in engine speed differing from a reference rate of decrease in engine speed by a threshold rate. The reference rate is based on a model of expected engine speed decay during the engine shutdown event for the engine (e.g., stored in the memory). In one example, the controller is further configured (e.g., by way of further computer readable instructions) to update the model (e.g., stored in memory) of expected engine speed decay based on the determined first rate of decrease in engine speed during the engine shutdown event and to determine a new reference rate bate based on the updated model (e.g., updated stored model). In another example, the system may further comprise a second crankshaft speed sensor positioned proximate to the first crankshaft speed sensor (e.g., and also operatively coupled to the controller), and the controller may be further configured (e.g., by way of further computer readable instructions) to: determine a second rate of decrease in engine speed output by the second crankshaft speed sensor during the engine shutdown event; compare the first rate with the second rate; and indicate the change in performance of the first crankshaft speed sensor in response to the first rate differing from the reference rate by the threshold rate and the second rate not differing from the reference rate by the threshold rate. In another example, the system may further comprise an engine cylinder and wherein the controller is further configured (e.g., by way of further computer readable instructions) to: indicate mechanical degradation of the engine cylinder in response to both the first rate and the second rate differing from the reference rate by less than the threshold rate; update a friction profile of the engine based on the first rate; and indicate reduced compression sealing of the engine cylinder in response to a reduction in the friction profile by greater than a threshold amount.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method for an engine, comprising:
    storing an initial engine speed profile in a memory of a controller;
    measuring an engine speed drop rate, via an engine speed sensor, during an engine shutdown event;
    indicating a change in performance of one of the engine speed sensor or an additional engine component in response to the measured engine speed drop rate deviating from a reference engine speed drop rate by an engine speed drop threshold rate;
    adjusting one or more engine operating parameters in response to the indication; and
    wherein the reference engine speed drop rate is determined based on the stored engine speed profile and further comprising updating the stored engine speed profile based on the measured engine speed drop rate.

2. The method of claim 1, further comprising building a friction profile of the engine over time based on changes to the stored engine speed profile and monitoring changes in the friction profile.

3. The method of claim 2, further comprising adjusting an engine operating parameter during engine operation following the engine shutdown event, based on the changes in the friction profile, to maintain a desired engine speed.

4. The method of claim 2, further comprising indicating the change in performance of the additional engine component in response to the friction profile changing by greater than a threshold friction amount.

5. The method of claim 4, wherein indicating the change in performance of the additional engine component includes:
    indicating one or more of wear to an engine valve, degradation of a piston liner, or degradation of a piston ring in response to the friction profile decreasing by at least the threshold friction amount; and
    indicating one or more of increased soot buildup on a rotating component of the engine, reduced lubrication to the rotating component, or degraded crankshaft bearings, in response to the friction profile increasing by at least the threshold friction amount.

6. The method of claim 1, wherein the engine speed sensor is a first crankshaft speed sensor and further comprising indicating the change in performance of the first crankshaft speed sensor in response to the measured engine speed drop rate deviating from the reference engine speed drop rate by the threshold rate and an engine speed drop rate measured by a second crankshaft speed sensor during the engine shutdown event not deviating from the reference engine speed drop rate by the threshold rate.

7. The method of claim 1, further comprising indicating the change in performance of the engine speed sensor in response to the measured engine speed drop rate deviating from the reference engine speed drop rate by the threshold rate and no additional diagnostic code being set in a controller of the engine indicating the change in performance of the additional engine component.

8. The method of claim 1, wherein measuring the engine speed drop rate via the engine speed sensor during the engine shutdown event occurs between a first time after engine shutdown when fueling to the engine is below a threshold fueling rate and an oil temperature of the engine is above a threshold oil temperature and a second time after engine shutdown when the engine speed decreases to a lower threshold engine speed.

9. The method of claim 8, wherein the first time includes after a final fuel injection into a last cylinder of the engine and further comprising, adjusting a fuel injection amount of the final fuel injection to adjust engine speed to a starting engine speed for measuring the engine speed drop rate during the engine shutdown event.

10. The method of claim 8, wherein the first time includes after a final fuel injection into a last cylinder of the engine and further comprising adjusting the measured engine speed drop rate based on a final engine speed during the final fuel injection.

11. The method of claim 2, further comprising initiating the engine shutdown event in response to the engine idling and a request to update an engine speed profile or friction profile of the engine during select engine operating conditions, where the stored engine speed profile and the friction profile are updated based on the measured engine speed drop rate during the engine shutdown event.

12. A system for an engine, comprising:
    a first crankshaft speed sensor; and
    a controller operatively coupled to the first crankshaft speed sensor and configured to:

determine a first rate of decrease in engine speed output by the first crankshaft speed sensor during an engine shutdown event;

indicate a change in performance of the first crankshaft speed sensor in response to the determined first rate of decrease in engine speed differing from a reference rate of decrease in engine speed by a threshold rate, the reference rate based on a model of expected engine speed decay during the engine shutdown event for the engine;

adjust operating parameters of the engine in response to the indication; and wherein the controller is further configured to update the model of expected engine speed decay based on the determined first rate of decrease in engine speed during the engine shutdown event and to determine a new reference rate based on the model that is updated.

13. The system of claim 12, further comprising a second crankshaft speed sensor positioned proximate to the first crankshaft speed sensor, wherein the controller is further configured to:

determine a second rate of decrease in engine speed output by the second crankshaft speed sensor during the engine shutdown event;

compare the first rate with the second rate; and indicate the change in performance of the first crankshaft speed sensor in response to the first rate differing from the reference rate by the threshold rate and the second rate not differing from the reference rate by the threshold rate.

14. The system of claim 13, further comprising an engine cylinder, wherein the controller is further configured to:

indicate mechanical degradation of the engine cylinder in response to both the first rate and the second rate differing from the reference rate by less than the threshold rate;

update a friction profile of the engine based on the first rate; and indicate reduced compression sealing of the engine cylinder in response to a reduction in the friction profile by greater than a threshold amount.

* * * * *